(12) United States Patent
Jin et al.

(10) Patent No.: US 9,503,838 B2
(45) Date of Patent: Nov. 22, 2016

(54) METHOD AND SYSTEM FOR COMMUNICATING BETWEEN DEVICES

(75) Inventors: Sung Geun Jin, Daejeon (KR); Jin Kyeong Kim, Daejeon (KR); Woo Young Lee, Daejeon (KR); Ki Chul Han, Daejeon (KR); Hyun Kyu Chung, Daejeon (KR); Byung Jae Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 14/241,430

(22) PCT Filed: Aug. 29, 2012

(86) PCT No.: PCT/KR2012/006890
§ 371 (c)(1),
(2), (4) Date: May 6, 2014

(87) PCT Pub. No.: WO2013/032222
PCT Pub. Date: Mar. 7, 2013

(65) Prior Publication Data
US 2014/0235172 A1    Aug. 21, 2014

(30) Foreign Application Priority Data
Aug. 29, 2011 (KR) .......................... 10-2011-0086752

(51) Int. Cl.
*H04B 5/00* (2006.01)
*G06F 3/044* (2006.01)
(Continued)

(52) U.S. Cl.
CPC .............. *H04W 4/008* (2013.01); *G06F 3/044* (2013.01); *G06F 13/382* (2013.01)

(58) Field of Classification Search
CPC ........................................................ H04B 5/00
See application file for complete search history.

(56) References Cited

U.S. PATENT DOCUMENTS

2002/0175814 A1* 11/2002 Wadlow ................... G01D 5/24
340/562
2005/0019900 A1* 1/2005 Broyer .................... B01L 3/502
435/287.1
(Continued)

FOREIGN PATENT DOCUMENTS

JP        2009-253478 A    10/2009
JP        2010-39527 A      2/2010
(Continued)

OTHER PUBLICATIONS

International Search Report for PCT/KR2012/006890 filed on Aug. 29, 2012.

*Primary Examiner* — Cindy Trandai (57) ABSTRACT

A method and system for communicating between devices according to the present invention are provided. The method for communicating between the devices according to the present invention is used for communicating with a first terminal, and is carried out in a device having a capacitive touch screen. The method includes: detecting a change in capacitance for a specific part of the capacitive touch screen, which occurs by means of the first terminal; and acquiring information transferred from the first terminal on the basis of the detected change in capacitance of the capacitive touch screen. The communicating method using such a touch screen may be easily used for various services such as authenticating terminals or transferring files between local terminals.

6 Claims, 8 Drawing Sheets

(51) Int. Cl.
*H04W 4/00* (2009.01)
*G06F 13/38* (2006.01)

(56) References Cited

U.S. PATENT DOCUMENTS

| | | | |
|---|---|---|---|
| 2007/0132620 A1* | 6/2007 | Nakamura | G09G 3/3648 341/144 |
| 2008/0157893 A1* | 7/2008 | Krah | G06F 3/0418 331/177 R |
| 2008/0318681 A1* | 12/2008 | Rofougaran | G01S 7/412 463/39 |
| 2009/0022139 A1* | 1/2009 | Lee | H04L 7/042 370/350 |
| 2009/0251339 A1 | 10/2009 | Naruse | |
| 2010/0271330 A1 | 10/2010 | Philipp | |
| 2011/0216032 A1* | 9/2011 | Oda | G06F 3/044 345/174 |
| 2011/0294426 A1* | 12/2011 | Matsubara | H04N 7/141 455/41.2 |
| 2011/0304583 A1* | 12/2011 | Kruglick | G06F 3/044 345/174 |
| 2012/0003929 A1 | 1/2012 | Hyoung et al. | |

FOREIGN PATENT DOCUMENTS

| | | |
|---|---|---|
| JP | 2011-120319 A | 6/2011 |
| KR | 20-0324928 Y1 | 9/2003 |
| KR | 10-2009-0031060 A | 3/2009 |
| KR | 10-2010-0103045 A | 9/2010 |

* cited by examiner

METHOD AND SYSTEM FOR COMMUNICATING BETWEEN DEVICES

CLAIM FOR PRIORITY

This application claims priority to Korean Patent Application No. 2011-0086752 filed on Aug. 29, 2011 in the Korean Intellectual Property Office (KIPO), the entire contents of which are hereby incorporated by reference.

BACKGROUND

1. Technical Field

Example embodiments of the present invention relate in general to a communication method between devices and a communication system for the same, and more specifically, to a communication method for transmitting and receiving information between devices positioned within a short distance, and a communication system for the same.

2. Related Art

As an example of the existing communication method used for transmitting information between devices positioned within a short distance, a method of using Wireless Fidelity (Wi-Fi) or Bluetooth may be given. Wi-Fi is wireless technology for connecting with wireless Internet, peripheral devices, and the like, and may be used even in home networking such as Nintendo dual screens (DS), play station portables (PSP), or the like, portable phones, video games, and the like.

Wi-Fi has a relatively long communication distance reaching about 100 m in comparison with Bluetooth that has a communication distance of about 10 m, but has a high terminal product price and high power consumption. Bluetooth uses a frequency bandwidth of 2.4 GHz, and enables a variety of devices to mutually communicate with each other using wireless frequencies at a transmission rate of 1 Mbps without any separate equipment, in a safe and inexpensive manner.

In a case in which simple information transmission or the like between devices positioned within a short distance is required, such as terminal authentication or a copy of a file, a complex registration process of a terminal should be performed when using a communication method such as Wi-Fi or Bluetooth, and inconvenience to a user is caused due to different user interfaces provided in each terminal, and therefore information transmission between devices positioned within a short distance may not be greatly utilized.

SUMMARY

Accordingly, example embodiments of the present invention are provided to substantially obviate one or more problems due to limitations and disadvantages of the related art.

Example embodiments of the present invention provide a communication method between devices that provides a convenient interface.

Example embodiments of the present invention also provide a communication device that enables a communication method between devices that provides a convenient interface.

Example embodiments of the present invention further provide a terminal device that enables a communication method between devices that provides a convenient interface.

In some example embodiments, a communication method with a first terminal performed in a device on which a capacitance-type touch screen is mounted, includes: detecting a change in capacitance with respect to a specific region of the capacitance-type touch screen, the change being generated by the first terminal; and acquiring information transmitted from the first terminal based on the detected change in capacitance of the capacitance-type touch screen.

Here, the acquiring may acquire the information from the first terminal based on at least one of an amount of change in capacitance with respect to the specific region of the capacitance-type touch screen, a magnitude of the capacitance, a rate of change in capacitance, and a phase difference between the rate of change in capacitance and a rate of change in reference capacitance.

Here, the detecting may detect the change in the capacitance of the capacitance-type touch screen, the change being generated by at least one capacitance variator mounted on the first terminal, and the acquiring may acquire the information from the first terminal based on the phase difference between each rate of the detected change in capacitance.

Here, the communication method may further include displaying the information acquired from the first terminal on a first region of the capacitance-type touch screen; and providing service, when specific information displayed on the first region is selected, corresponding to the selected information from the first terminal to a second terminal.

Here, the providing may be performed when a user's operation for transmitting the specific information displayed on the first region to a second region corresponding to the second terminal is detected.

Here, the providing may provide service corresponding to the selected information from the first terminal to the second terminal on which a photo-sensitive sensor is mounted, using the capacitance-type touch screen.

Here, the service corresponding to the selected information may be provided in such a manner that the photo-sensitive sensor of the second terminal reacts by changing pixels of the specific region of the capacitance type-touch screen.

Here, the providing may provide service corresponding to the selected information directly to the second terminal from the first terminal.

In other example embodiments, a device of communicating with a first terminal using a capacitance-type touch screen, includes: a capacitance-type touch screen; at least one capacitance change detecting sensor that is mounted on the capacitance-type touch screen to thereby detect a change in capacitance with respect to a specific region of the capacitance-type touch screen, the change being generated by the first terminal; and an information acquisition unit that acquires information from the first terminal based on the detected change in capacitance.

Here, the information acquisition unit may acquire the information from the first terminal based on at least one of an amount of change in capacitance with respect to the specific region of the capacitance-type touch screen, a magnitude of the capacitance, a rate of change in capacitance, and a phase difference between the rate of change in capacitance and a rate of change in reference capacitance.

Here, at least one capacitance variator may be mounted on the first terminal, the at least one capacitance change detecting sensor may detect a change in capacitance of the capacitance-type touch screen, the change being generated by the at least one capacitance variator, and the information acquisition unit may acquire the information from the first terminal based on a phase difference between each rate of the detected change in capacitance of the capacitance-type touch screen.

Here, the information acquisition unit may display the information acquired from the first terminal on the first region of the capacitance-type touch screen, and the device may further include a service provision unit that provides, when specific information displayed on the first region is selected, service corresponding to the selected information from the first terminal to the second terminal.

Here, the service provision unit may select the specific information displayed on the first region, and provide, when a user's operation for transmitting the selected information to a second region corresponding to the second terminal is detected, service corresponding to the specific information to the second terminal.

In still other example embodiments, a terminal that communicates with a device having a capacitance-type touch screen, includes: a capacitance variator that generates a change in capacitance in a specific region of the capacitance-type touch screen; and a transmission unit that transmits information to the device using the capacitance variator.

Here, the terminal may further include a photo-sensitive sensor that reacts to a change in information on the capacitance-type touch screen; and an information acquisition unit that acquires information from the device based on the reaction of the photo-sensitive sensor.

Here, the photo-sensitive sensor may react to a change in pixel information of the specific region on the capacitance-type touch screen.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

It should also be noted that in some alternative implementations, operations may be performed out of the sequences depicted in the flowcharts. For example, two operations shown in the drawings to be performed in succession may in fact be executed substantially concurrently or even in reverse of the order shown, depending upon the functionality/acts involved.

Hereinafter, a communication method between devices using a capacitance-type touch screen according to embodiments of the present invention and a device using the same will be described.

According to an embodiment of the present invention, there is suggested a method in which communication is performed, via a capacitance-type touch screen, between a terminal to which a communication method according to the present invention is applied, such as a Universal Subscriber Identity Module (USIM) terminal, a mobile phone, or a smart phone, and a device on which the capacitance-type touch screen is mounted.

Hereinafter, a preferable embodiment of the present invention will be described referring to accompanying drawings in detail. Throughout the accompanying drawings, the same reference numerals are used to designate the same or similar components, and redundant descriptions thereof are omitted.

Figure 1:
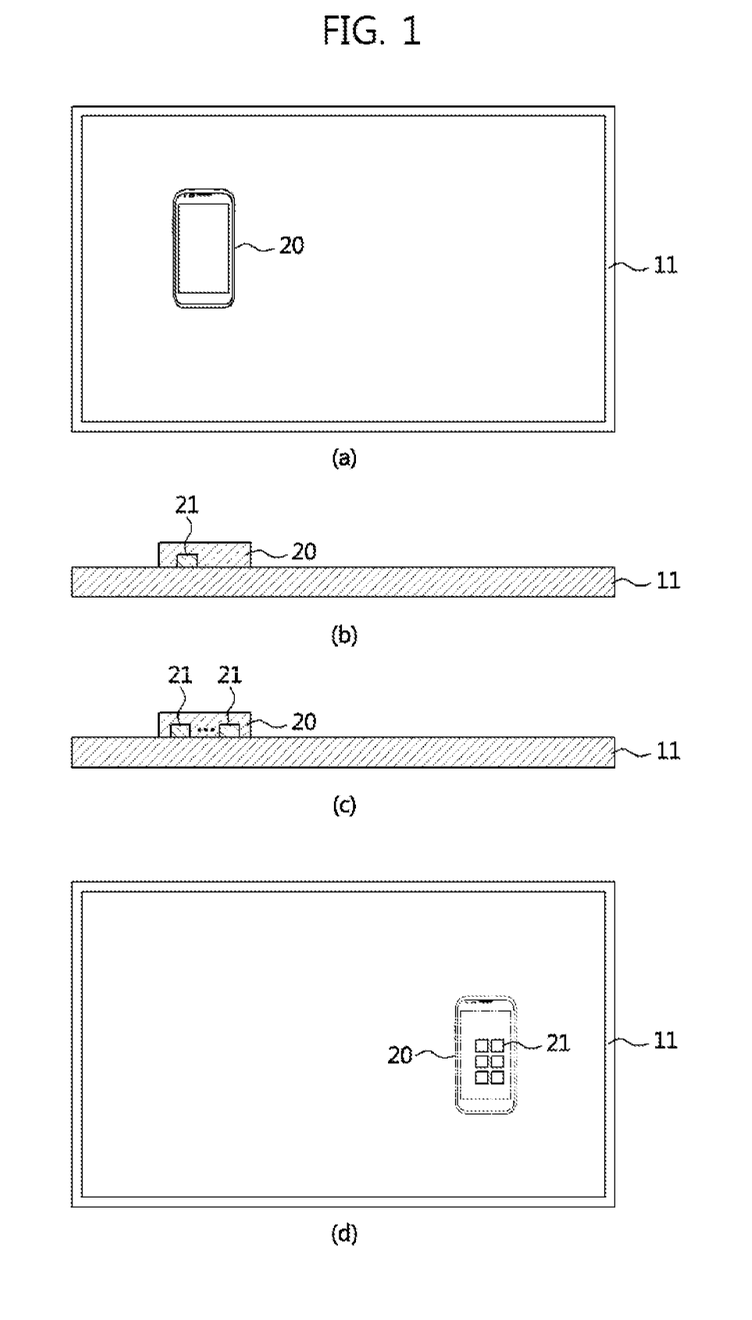
FIG. 1 is a conceptual diagram showing a state in which a terminal on which a capacitance variator is mounted is positioned on a capacitance-type touch screen according to an embodiment of the present invention.

FIG. 1 is a conceptual diagram showing a state in which a terminal on which a capacitance variator is mounted is positioned on a capacitance-type touch screen according to an embodiment of the present.

Referring to FIG. 1A, a capacitance-type touch screen 11 detects a change in capacitance using a variable capacitance change detecting sensor to thereby determine whether input on the touch screen is performed by a user.

FIGS. 1B and 1C show a cross section of the touch screen 11 in which a terminal 20 is positioned, and FIG. 1D shows the terminal 20 on which six capacitance variators are mounted. Referring to FIGS. 1B and 1D, the terminal device 20 suggested in the present invention may mount at least one capacitance variator 21 for generating a change in capacitance on the capacitance-type touch screen 11. When the change in capacitance on the touch screen 11 is generated by the capacitance variator 21, the touch screen 11 may detect such a change in capacitance, and acquire information from the terminal 20 based on the detected change in capacitance.

Figure 2:
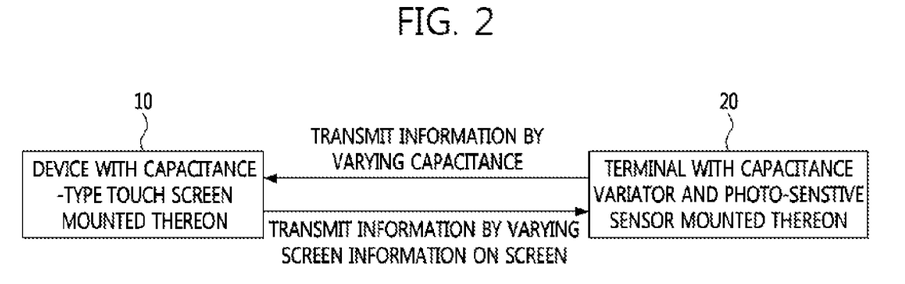
FIG. 2 is a conceptual diagram showing a communication system using a capacitance-type touch screen according to an embodiment of the present invention.

FIG. 2 is a conceptual diagram showing a communication system using a capacitance-type touch screen according to an embodiment of the present invention.

Referring to FIG. 2, the communication system using the capacitance-type touch screen according to an embodiment of the present invention may include a capacitance type-device 10 and the terminal 20. As shown in FIG. 1, the capacitance-type touch screen 11 is mounted on the capacitance type-communication device 10, and at least one capacitance variator 21 and a photo-sensitive sensor 22 may be mounted on the terminal 20.

In this manner, the terminal 20 of FIG. 1 may transmit information to the capacitance type-communication device 10 while changing the amount of capacitance of the capacitance-type touch screen 11 so that a variable capacitance change detecting sensor of the capacitance-type touch screen 11 reacts. In this instance, the change in the amount of capacitance may be measured in the form of a voltage or a current.

The communication method of the present invention may be used in automatic pairing between devices or authentication of terminals. As a transmission device, in general, a smart phone, a cellular phone, a wireless storage device, or the like may be used, and the transmission device may often have various and complex communication interfaces. Here, the transmission device is required to set connection after performing device authentication with a reception device having a touch screen, as necessary.

In this instance, when authentication information required for device authentication or user authentication is transmitted using an information transmission method using a touch screen, the reception device may utilize the received authentication information for the user authentication or the device authentication.

Figure 3:
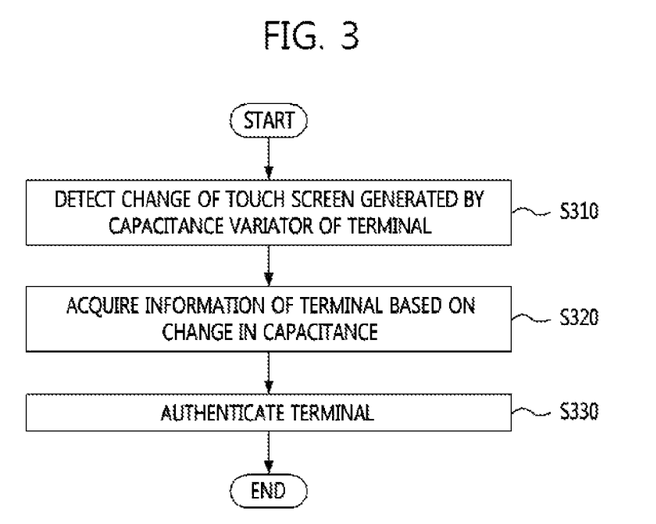
FIG. 3 is a flowchart showing a process of authenticating a terminal using a capacitance-type touch screen according to an embodiment of the present invention.

FIG. 3 is a flowchart showing a process of authenticating a terminal using a capacitance-type touch screen according to an embodiment of the present invention.

Referring to FIG. 3, the process of authenticating the terminal using the capacitance-type touch screen may include detecting a change in capacitance of the capacitance-type touch screen in step S310, acquiring information of a terminal in step S320, and authenticating the terminal in step S330.

In addition, referring to FIG. 3, each step of the process of the authenticating the terminal using the capacitance-type touch screen according to an embodiment of the present invention will be described as below.

The detecting S310 of the change in capacitance may detect the change in capacitance with respect to a specific portion of the touch screen, which is generated by the terminal. For example, one or a plurality of capacitance variators is mounted on the terminal, and when the change in capacitance of the capacitance-type touch screen is generated by an operation of the capacitance variator, the generated change may be detected.

The acquiring of the information S320 may acquire information transmitted from the terminal based on the change in capacitance of the touch screen, which is detected in the detecting S310. For example, the information transmitted to the terminal may be acquired based on information such as an amount of change in capacitance with respect to the specific portion of the touch screen, a magnitude of the capacitance, a rate of change in capacitance, and a phase difference between the rate of change in capacitance and a rate of change in reference capacitance, or based on a combination thereof.

In addition, when the change in the capacitance of the touch screen is independently generated by the plurality of capacitance variators mounted on the terminal, the information transmitted from the terminal may be acquired based on the phase difference between each rate of change in the capacitance generated as above.

The authenticating S330 of the terminal may permit communication with the terminal by authenticating the terminal based on the information transmitted from the terminal.

Figure 4:
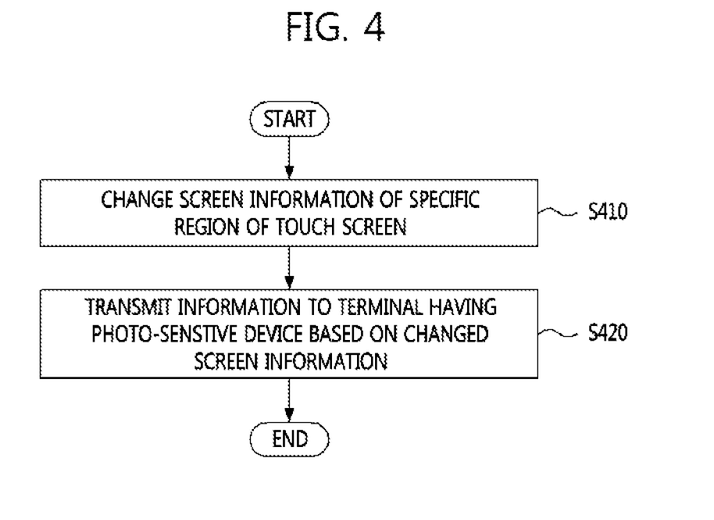
FIG. 4 is a flowchart showing a process of transmitting information to a terminal using a capacitance-type touch screen according to an embodiment of the present invention.

FIG. 4 is a flowchart showing a process of transmitting information to a terminal using a capacitance-type touch screen according to an embodiment of the present invention Referring to FIG. 4, the process of transmitting the information to the terminal using the capacitance-type touch screen according to an embodiment of the present invention may include changing screen information in step S410, and transmitting information in step S420.

In addition, referring to FIG. 4, each step of the process of transmitting the information to the terminal using the capacitance-type touch screen according to an embodiment of the present invention will be described as below.

The changing S410 of the screen information may change pixels in a specific region of the touch screen. That is, for example, a photo-sensitive sensor is mounted on the terminal, and the changing S410 may change information such as color, brightness, chroma, luminance, and the like within a designated region of the touch screen in order to enable the corresponding photo-sensitive sensor to react.

The transmitting S420 of the information may transmit information to the terminal based on the changed screen information within the specific region of the touch screen.

As described above, in the communication method using the capacitance-type touch screen, bi-directional communication may be performed by utilizing each function of two devices, but a function of transmitting information only in one direction by inducing a change in capacitance on the touch screen may be utilized in transmit information.

In order to transmit information through the touch screen using the change in capacitance, a communication method which is prearranged between an information transmission device and an information reception device, that is, a communication protocol, is required. A synchronous method and an asynchronous scheme are suggested for efficiently transmitting information.

Figure 5:
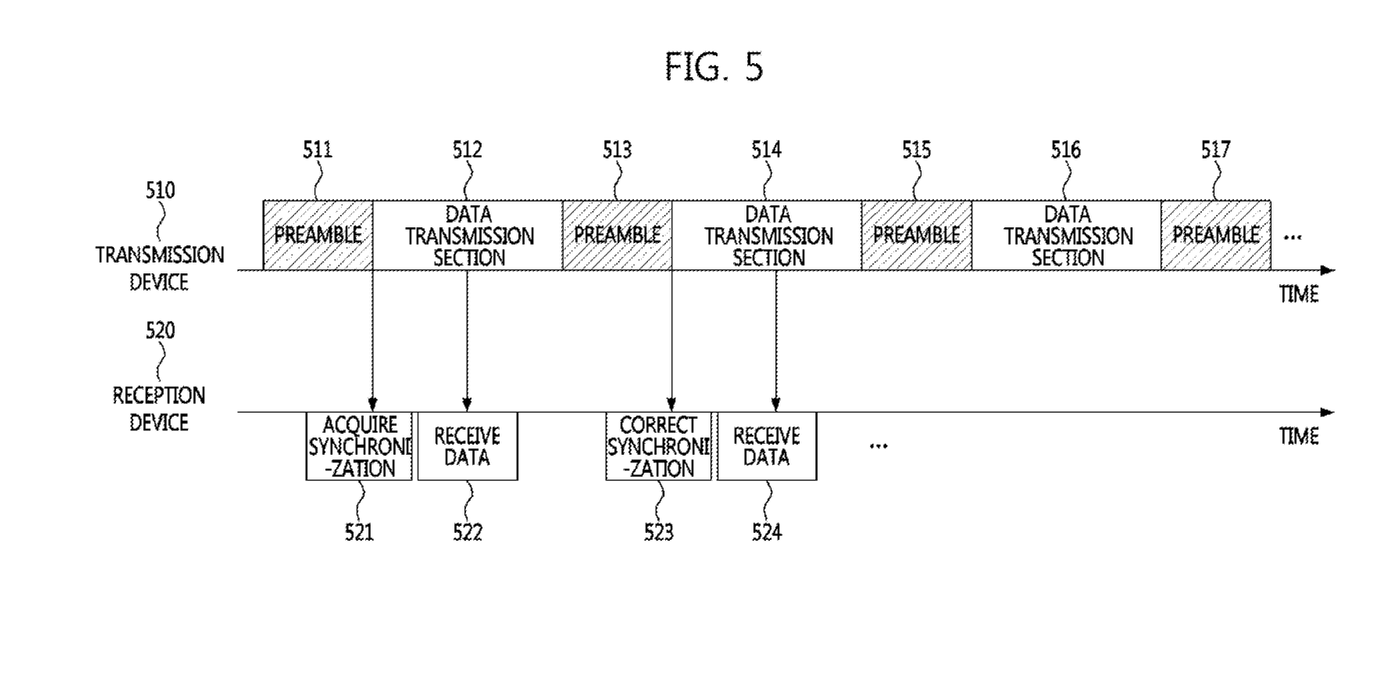
FIG. 5 is a conceptual diagram showing a method of transmitting information in a synchronous scheme according to an embodiment of the present invention.

FIG. 5 is a conceptual diagram showing a method of transmitting information in a synchronous scheme according to an embodiment of the present invention.

The synchronous scheme is a scheme in which a preamble transmission section and a data transmission section which enable a reception device to acquire synchronization to a transmission device are repeatedly allocated in a predetermined length and period. For example, referring to FIG. 5, an example in which the preamble transmission section is composed of sections 511, 513, 515, and 517 each having a given time interval, and the data transmission section is composed of sections 512, 514, and 516 each having a given time interval, and the sections 512, 514, and 516 are present between the preamble sections is shown.

Meanwhile, the preamble is a prearranged signal which is continuously transmitted to the preamble transmission section by the transmission device, and the reception device extracts visual information from the preamble continuously received to thereby temporally synchronize with the transmission device.

In FIG. 5, the preamble 511 is transmitted from the transmission device 510 so that the reception device 520 acquires synchronization. When synchronization is acquired, the reception device 520 may send a synchronization acquisition response signal (not shown) using another medium through which information is transmitted from the reception device 520 to the transmission device 510 (for example, information is transmitted in such a manner that the photo-sensitive sensor of the transmission device 510 reacts by changing pixels of the touch screen, or information is transmitted using a transmission/reception method such as Wi-Fi, Bluetooth, Zigbee, or the like). However, the reception device 520 may not notify the synchronization acquisition to the transmission device 510 as a separate signal.

The transmission device 510 may transmit data at the data transmission section 512 after the preamble 511, and the reception device 520 may receive the data transmitted by the transmission device at the same section in step 522.

When data transmission at the given data transmission section 512 is completed, the transmission device 510 transmits the preamble at the preamble section 513 again, and continues to transmit data at the next data section 514. In this instance, since synchronization is acquired at the previous preamble section 511 in the reception device 520, visual information acquired at the preamble section 513, which is to be transmitted thereafter, may be used for synchronization correction.

In the synchronous transmission method described above, once acquiring synchronization with the transmission device, the reception device may recognize a point of time when the preamble is transmitted by the transmission device and a point of time when data is transmitted by the transmission device, and therefore a continuous reception mode operation for detecting the point of time when the preamble or data is transmitted thereafter may not be required.

Figure 6:
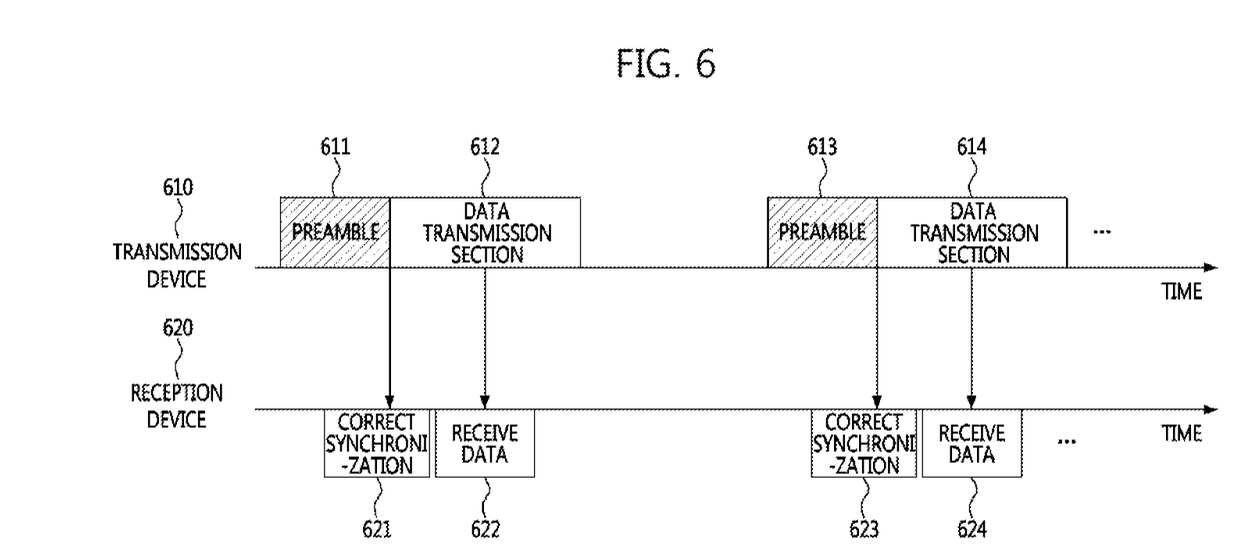
FIG. 6 is a conceptual diagram showing a method of transmitting information in an asynchronous scheme according to an embodiment of the present invention.

FIG. 6 is a conceptual diagram showing a method of transmitting information in an asynchronous scheme according to an embodiment of the present invention.

Referring to FIG. 6, in an asynchronous transmission method, data with preambles 611 and 613 is transmitted every time a transmission device 610 transmits data in steps 612 and 614 with information, and the reception device 520 receives data in steps 622 and 624 after acquiring synchronization in steps 621 and 623.

In the asynchronous transmission method, since a preamble transmission section and a data transmission section are not allocated in a predetermined length and period, a length of the data transmission section may be varied. However, even though the point of time when a preamble and data are presently transmitted is known, the reception device cannot know the point of time when the following preamble and data are to be transmitted, and therefore the reception device should detect the point of time when the preamble and data are transmitted by the transmission device while always operating in a reception mode.

In this manner, location information may be acquired using the preamble transmitted to the reception device from the transmission device. When the transmission device, for example, a terminal positioned on the touch screen, transmits a preamble, the reception device may verify to which region of the touch screen the preamble is received to thereby acquire the location position on the touch screen. In this manner, the acquired location information on the touch screen may be utilized in a user interface when two different transmission devices are present. Obviously, the above-described method is merely an example, and a method of verifying the location information is not limited thereto.

Hereinafter, an example in which a file is transmitted from a first terminal to a second terminal using the capacitance-type touch screen between terminals will be described.

Figure 7:
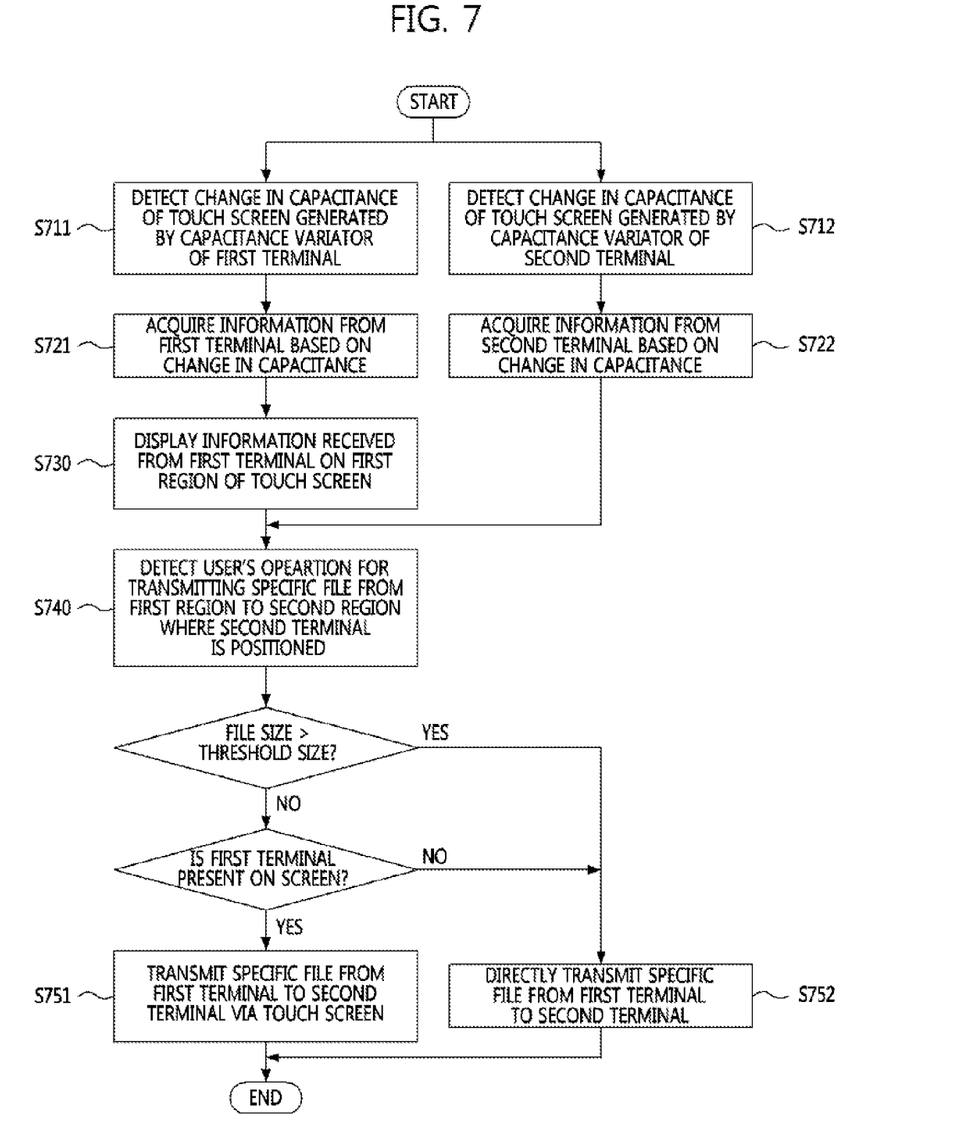
FIG. 7 is a flowchart showing a process of performing file transmission between terminals using a capacitance-type touch screen according to an embodiment of the present invention.

FIG. 7 is a flowchart showing a process of performing file transmission between terminals using a capacitance-type touch screen according to an embodiment of the present invention.

Referring to FIG. 7, the process of performing file transmission between terminals using the capacitance-type touch screen according to an embodiment of the present invention may include detecting a change in capacitance in steps S711 and S712, acquiring information in steps S721 and S722, detecting a user's operation in step S740, and transmitting a file in steps S751 and S752.

In addition, referring to FIG. 7, the process of performing file transmission between terminals using the capacitance-type touch screen according to an embodiment of the present invention will be described as below.

The detecting S711 and S712 of the change in capacitance may detect a change in a capacitance with respect to a specific region of the touch screen. That is, for example, when a specific file is to be transmitted from a first terminal positioned in a first region on the touch screen to a second terminal positioned in a second region, at least one capacitance variator for inducing a change in capacitance of the capacitance-type touch screen may be mounted on the first terminal. When the change in capacitance of the capacitance-type touch screen occurs by an operation of the capacitance variator, the occurring change may be detected by a capacitance change detecting sensor of the touch screen in step S711.

In addition, at least one capacitance variator for inducing a change in capacitance of the capacitance-type touch screen may be mounted on the second terminal, and when a change in capacitance occurs in other regions of the capacitance-type touch screen by an operation of the capacitance variator, the occurring change may be detected by the capacitance change detecting sensor of the touch screen in step S712.

The acquiring S721 and S722 of the information may acquire information transmitted from a terminal based on the change in capacitance of the touch screen which is detected in the detecting S711 and S712. In this instance, the information acquired from the first terminal in step S721 may be basic information of the first terminal itself or information of files stored in the terminal. Meanwhile, the information acquired from the second terminal in step S722 may be basic information of the second terminal itself or information of files stored in the terminal. In addition, location information of the first and second terminals on the touch screen may be acquired, and the acquired information may be used when a file is transmitted to the second terminal from the first terminal.

In addition, using the acquired location information of the terminals, a predetermined portion in the vicinity of a region where the terminal is positioned on the touch screen may be acquired and displayed as a region for the terminal. Which information is acquired may be determined through a value set in advance in the terminal, a user's operation via an interface of the terminal, a value set in a device having the capacitance-type touch screen, or an input value from a user.

The displaying S730 of the information may display the information acquired from the first terminal on the first region of the capacitance-type touch screen where the first terminal is positioned, or on other regions. In this instance, the displayed information may be basic information of the first terminal, information of files (for example, movies, music, documents, and the like) stored in the terminal, or a variety of services. The information displayed on the touch screen may not be limited.

The detecting S740 of the user's operation may detect manual activity for transmitting the files or the like of the first terminal displayed on the touch screen to the second terminal. Hereinafter, the detailed description thereof will be described with reference to drawings.

Figure 8:
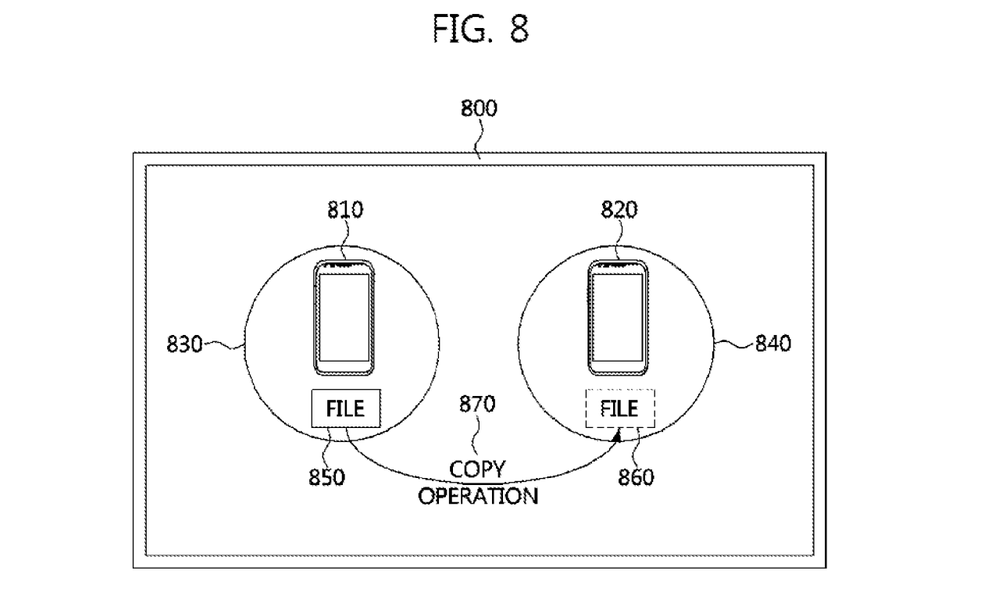
FIG. 8 is a conceptual diagram showing an operation of copying a file between terminals located on a touch screen according to an embodiment of the present invention.

FIG. 8 is a conceptual diagram showing an operation of copying a file between terminals located on a touch screen according to an embodiment of the present invention.

Referring to FIG. 8, a first terminal 810 is positioned in a left region of a touch screen 800, and a second terminal 820 is positioned in a right region thereof. In addition, circle-like first and second regions 830 and 840 are displayed respectively in the vicinity of the first and second terminals 810 and 820. These regions 830 and 840 are regions for identifying a location of a terminal or a location corresponding to the terminal, and a boundary thereof may be displayed visibly or invisibly for user's convenience.

In addition, information about a file 850 which is acquired from the first terminal 810 is displayed on the first region 830 on the touch screen 800. In this instance, when a user tries to copy the file 850 to the second terminal 820, the file 850 to be copied on the touch screen using a hand or the like is designated, and a user's operation 870 of drawing the designated file 850 from the first region 830 to the second region 840 may be performed. The user's operation 870 is detected by the touch screen, and the following operation corresponding to the detection may be performed.

As another example, a case in which the first terminal that transmits data is removed from the touch screen after authentication with a communication device having the touch screen is completed, is given.

Figure 9:
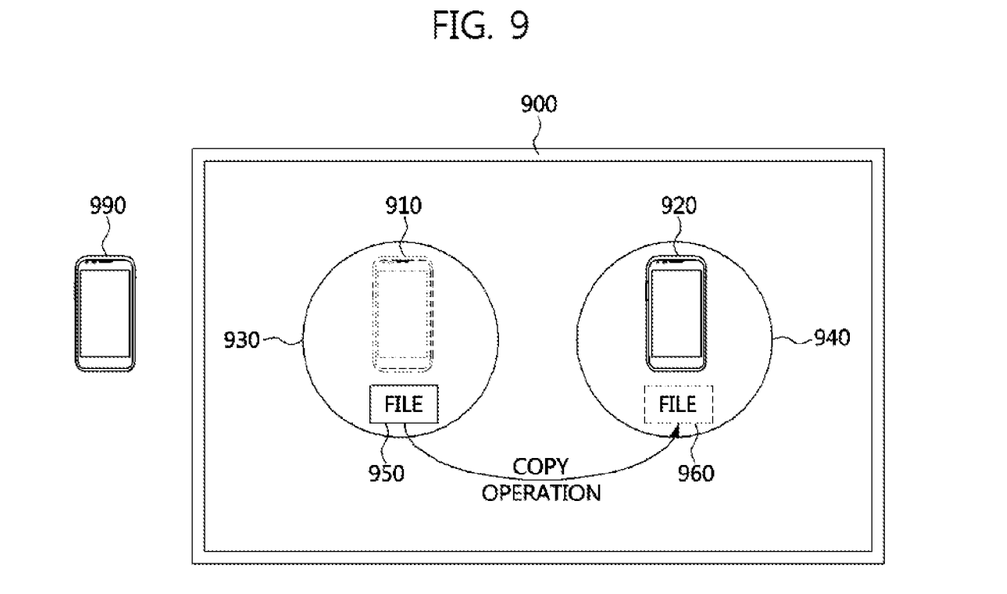
FIG. 9 is a conceptual diagram showing an operation of transmitting a file to a reception terminal after a transmission terminal is removed from a touch screen according to an embodiment of the present invention.

FIG. 9 is a conceptual diagram showing an operation of transmitting a file to a reception terminal after a transmission terminal is removed from a touch screen according to an embodiment of the present invention.

Referring to FIG. 9, a first terminal 910 that is not a real terminal is displayed on a left side region of a touch screen 900, a second terminal 920 is displayed on a right side region thereof, and the first terminal 910 is actually deviated from the touch screen 900. In the same manner as that in FIG. 8, circle-like first and second regions 930 and 940 are respectively displayed in the vicinity of the first terminal 910 and the second terminal 920.

In addition, information about a file 950 which is acquired from the first terminal 910 is displayed on the first region 930 of the touch screen 900. In this instance, in the same manner as that in FIG. 9, a user may copy the file 950 to the second terminal 920. That is, the file 950 to be copied on the touch screen using a hand or the like is designated, and a user's operation of drawing the designated file 950 from the first region 930 to the second region 940 may be performed. The user's operation is detected by the touch screen, and the following operation corresponding to the detection may be performed. However, since the first terminal that is to transmit a file is not actually present on the touch screen 900, the file may be transmitted in the following method, unlike FIG. 8.

Hereinafter, a process in which the file selected for each above-described case is transmitted from the first terminal to the second terminal will be described.

The transmitting S751 and 752 of the file may transmit a file selected by a user on the touch screen from the first terminal to the second terminal. In this instance, in step S751, the file may be transmitted from the first terminal to the second terminal via the capacitance-type touch screen. In addition, in step S752, the file may be directly transmitted from the first terminal to the second terminal using a communication scheme such as Bluetooth or WiFi.

For example, when the file size is not large and a photo-sensitive sensor is mounted on the second terminal, the file may be transmitted to the second terminal in step S751 in a method of enabling the photo-sensitive sensor of the second terminal to react by changing screen information on the touch screen. When the file size is large and the photo-sensitive sensor is not mounted on the second terminal, the file may be transmitted directly from the first terminal to the second terminal in step S752 using a communication scheme such as Bluetooth or WiFi. For direct communication, information about a communication scheme of each terminal should be acquired in steps S721 and S722.

Meanwhile, in the same manner as that in FIG. 9, when the transmission terminal is removed from the touch screen 900 and only an image 910 of the terminal is present, the selected file may be directly transmitted from the first terminal to the second terminal in step S752.

Figure 10:
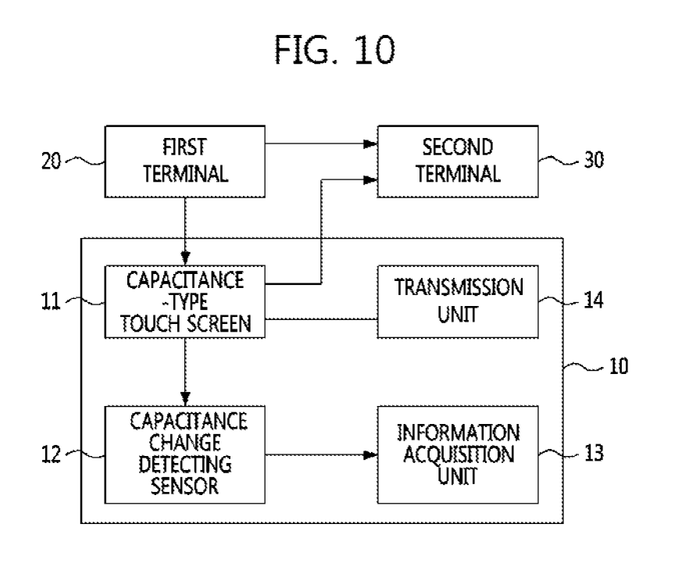
FIG. 10 is a block diagram showing a configuration of a device of communicating with a terminal using a capacitance-type touch screen according to an embodiment of the present invention.

FIG. 10 is a block diagram showing a configuration of a device of communicating with a terminal using a capacitance-type touch screen according to an embodiment of the present invention.

Referring to FIG. 10, a device 10 of communicating with a terminal using the capacitance-type touch screen according to an embodiment of the present invention may include a capacitance-type touch screen 11, a capacitance change detecting sensor 12, an information acquisition unit 13, and a transmission unit 14. In addition, referring to FIG. 10, operations of each component of the device of communicating with the terminal using the capacitance-type touch screen according to an embodiment of the present invention, and a connection relationship between the components thereof will be described as follow.

The capacitance change detecting sensor 12 may be mounted on the capacitance-type touch screen 11 and detect a change in capacitance with respect to a specific portion of the capacitance-type touch screen, which is generated by the first terminal 20. The information acquisition unit 13 may acquire information from the first terminal 20 based on the change in capacitance of the touch screen detected in the capacitance change detecting sensor 12. In this instance, the information acquisition unit 13 may acquire the information from the first terminal 20 based on at least one of an amount of change in capacitance with respect to the specific region of the capacitance-type touch screen 11, a magnitude of the capacitance, a rate of change in capacitance, and a phase difference between the rate of change in capacitance and a rate of change in reference capacitance. In addition, the information acquisition unit 13 may display the information acquired from the first terminal 20 on the first region of the capacitance-type touch screen 11.

The transmission unit 14 may detect, when a user's operation of selecting specific information among the information acquired from the first terminal 20 displayed on the first region and transmitting the selected information to the second terminal is performed, the user's operation, and transmit a file corresponding to the selected information from the first terminal 20 to the second terminal 30.

In this instance, the transmission of the file may be performed in such a manner that the photo-sensitive sensor mounted on the second terminal 30 reacts by changing pixels of the specific region of the capacitance-type touch screen 11 while the file is transmitted from the first terminal 20 to the second terminal 30 via the capacitance-type touch screen 11.

Otherwise, the file corresponding to the selected information may be directly transmitted from the first terminal to the second terminal in a wireless communication method such as Bluetooth or Wi-Fi.

Figure 11:
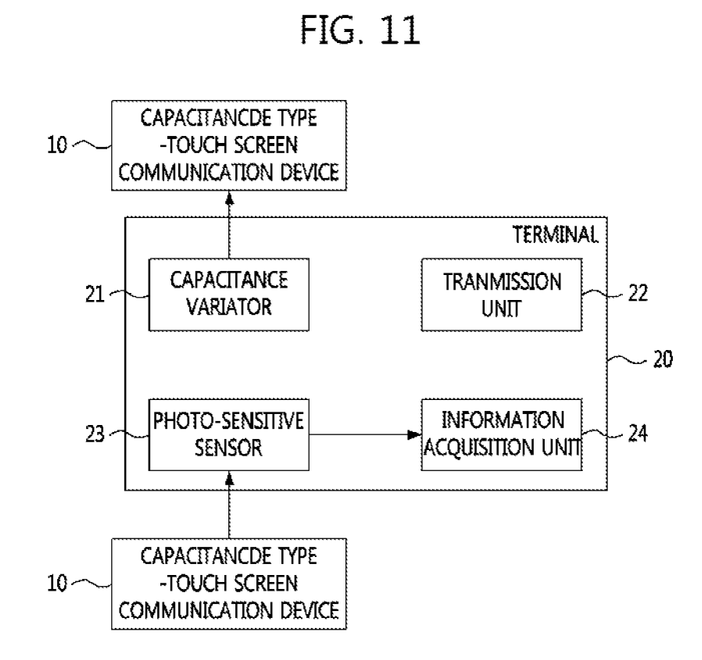
FIG. 11 is a block diagram showing a configuration of a terminal that communicates using a change in capacitance of a touch screen according to an embodiment of the present invention.

FIG. 11 is a block diagram showing a configuration of a terminal that communicates using a change in capacitance of a touch screen according to an embodiment of the present invention.

Referring to FIG. 11, a terminal 20 of communicating using a change in capacitance of the touch screen according to an embodiment of the present invention may include a capacitance variator 21, a transmission unit 22, a photo-sensitive sensor 23, and an information acquisition unit 24.

In addition, referring to FIG. 11, operations of each component of the device 20 of communicating using the change in capacitance of the touch screen according to an embodiment of the present invention, and a connection relationship between the components thereof will be described as follows.

The capacitance variator 21 is a device of generating a change in capacitance, and in the present embodiment, the capacitance variator 21 operates in such a manner that a change in capacitance with respect to the capacitance-type touch screen is generated. The transmission unit 22 may transmit information to the capacitance-type touch screen communication device 10 using the operation of the capacitance variator 21.

Meanwhile, the photo-sensitive sensor 23 and the information acquisition unit 24 may be components that operate in order to receive information. For example, the photo-sensitive sensor 23 may react to a change in information on the touch screen of the capacitance-type touch screen communication device 10, for example, a change in specific pixel information, and the information acquisition unit 24 may acquire information from the communication device 10 based on the reaction of the photo-sensitive sensor 23.

As described above, according to the embodiments of the present invention, through a communication method between a terminal on which the capacitance variator is mounted, and a device on which the capacitance-type touch screen is mounted as above, according to embodiments of the present invention, capacitance of the touch screen is varied by the capacitance variator of the terminal, and therefore information may be transmitted from the terminal to the device on which the capacitance-type touch screen is mounted, using the amount of change of capacitance or the rate of change of the capacitance.

In addition, pixel information or the like of the touch screen may be changed, and therefore information may be transmitted from the terminal to the device on which the touch screen is mounted. The communication method using the touch screen may provide a convenient user interface, and therefore a variety of services such as authentication of terminals or file transmission between terminals positioned within a short distance may be conveniently used.

While the example embodiments of the present invention and their advantages have been described in detail, it should be understood that various changes, substitutions and alterations may be made herein without departing from the scope of the invention.

What is claimed is:

1. A communication method between a first terminal and a device on which a capacitance-type touch screen is mounted, the communication method comprising:

detecting, by a capacitance sensor mounted on the capacitance-type touch screen, a capacitance changed by at least one capacitance variator mounted on the first terminal, the changed capacitance detected with respect to a specific region of the capacitance-type touch screen;

acquiring information from the first terminal based on the detected changed capacitance of the capacitance-type touch screen;

displaying the information acquired from the first terminal on a first region of the capacitance-type touch screen; and when specific information displayed on the first region is selected, transferring the selected information from the first terminal to a second terminal, wherein transferring the selected information includes transmitting the specific information displayed on the first region to a second region corresponding to the second terminal when a user's input on the touch screen is detected, and wherein transferring the selected information from the first terminal to the second terminal includes transferring, by the capacitance-type touch screen, the selected information to a photo-sensitive sensor mounted on the second terminal.

2. The communication method of claim 1, wherein the selected information is transferred to the photo-sensitive sensor by changing pixels of the specific region of the capacitance type-touch screen, the changing pixels being sensed by the photo-sensitive sensor.

3. The communication method of claim 1, wherein the selected information is transferred directly to the second terminal from the first terminal.

4. The communication method of claim 1, wherein the first terminal is removed from the capacitance-type touch screen after the acquired information is displayed.

5. A device communicating with a first terminal, the device comprising:
 a capacitance-type touch screen;
 at least one capacitance sensor that is mounted on the capacitance-type touch screen, the capacitance sensor being configured to detect a capacitance changed by at least one capacitance variator mounted on the first terminal, the changed capacitance being detected with respect to a specific region of the capacitance-type touch screen; and
 an information acquisition unit configured to acquire information from the first terminal based on the detected changed capacitance,
 wherein the information acquisition unit displays the information acquired from the first terminal on a first region of the capacitance-type touch screen,
 wherein the device further comprises a service provision unit configured to transfer, when specific information displayed on the first region is selected by a user's input on the touch screen, the selected information from the first terminal to a second terminal,
 wherein the service provision unit is configured to select the specific information displayed on the first region, and to transmit, when the user's input is detected, the selected information to a second region corresponding to the second terminal,
 wherein the service provision unit is configured to transfer the selected information from the first terminal to the second terminal, through a photo-sensitive sensor mounted on the second terminal, by changing pixels of the specific region of the capacitance-type touch screen, and
 wherein the changing pixels are sensed by the photo sensitive sensor mounted on the second terminal.

6. The device of claim 5, wherein the service provision unit is configured to provide the selected information directly from the first terminal to the second terminal.

* * * * *